Patented June 30, 1931

1,811,972

UNITED STATES PATENT OFFICE

FRITZ SCHMIDT, OF TROISDORF, NEAR COLOGNE, GERMANY

PROCESS FOR THE PRODUCTION OF ARTIFICIAL HORN

No Drawing. Application filed February 20, 1925, Serial No. 10,693, and in Germany November 27, 1924.

The greater plasticity which cellulose derivatives have with respect to protein substances have in the past led to experiments for combining both in order to improve the plastic properties of the protein, particularly casein. In the operation casein was first immersed in an alkaline solvent, for example, a solution of borax, held therein and then treated with alcohol and nitrocellulose solvents and then united with a mass of nitrocellulose between rolls. The defect of this method is that alkaline solvents cannot be completely washed from plastic masses and as a result render these latter opaque. In addition, they act saponifyingly on cellulose derivatives, thus causing partial decomposition thereof. The present invention, on the contrary, is carried out in much simpler manner without presenting the defects of methods hitherto employed.

This invention relates to a process for the production of artificial horn from proteins and cellulose derivatives, making use of volatile, water-soluble solvents of the cellulose derivatives in question of the kind, which by themselves do not act as a solvent for proteins but, when mixed with water, cause the proteins to swell. For instance it is possible to cause proteins to combine with celluloid simply by a mixture of water and alcohol or a mixture of acetone and water or a mixture of lactic acid diethyl ester with water. This is effected preferably by first gelatinizing the proteins with the particular mixture of solvent and water in the kneading machine until a homogeneous kneaded mass is obtained. This mass is thereupon worked up in the kneading machine or on the rolls, for instance with a mass of kneaded celluloid, which has itself been mixed either only with the volatile celluloid solvent referred to, for instance alcohol or acetone or lactic acid ethyl ester, or again with a mixture of the solvent referred to with water; or a celluloid, for instance, which is entirely free of solvent may be made on the rolls, by kneading up in a hot state cellulose derivatives with gelatinizing agents in the presence of water only and to it may be added the kneaded mass referred to above made of proteins with a mixture of a solvent and water. In all three cases a homogeneous artificial horn of proteins and cellulose derivatives is obtained.

For gelatinizing the proteins a mixture of equal parts of alcohol and water may for instance be used; of such a mixture about 30–50 parts will be required for 100 parts of proteins, for working up the latter into a mass that will knead well. A kneaded mass of celluloid for instance for uniting with it may contain for 100 parts celluloid for instance 60 parts of alcohol or of a mixture of alcohol and water. The conditions are quite analogous, when for instance mixtures of acetone and water or other mixtures of solvent and water are used. The process under discussion may of course be varied by effecting the gelatinization of the proteins and cellulose derivatives simultaneously in the same mixing machine.

*Examples*

1. Mix 30 kg. nitrocellulose (or a mixture of nitrocellulose with camphor or camphor substitute) with 10 kg. glycoldiacetate and 20 kg. alcohol; also mix 60 kg. unchanged-commercial casein with a mixture of 5 kg. glycoldiacetate, 5 kg. alcohol and 10 kg. water. The two mixtures are worked up in an open kneading machine or in rolls into a homogeneous mass and may thereupon be treated under pressure or in rolls.

2. Mix 30 kg. acetylcellulose (or 30 kg. of a mixture thereof with camphor substitute, for instance, triacetin) with 25 kg. of lactic acid ethyl ester and 20 kg. of water. The further treatment of the masses thus obtained is as above.

3. Mix 30 kg. ethylcellulose with 20 kg. alcohol; also mix 60 kg. vegetable proteins (for instance soy bean protein) with 10 kg. alcohol and 10 kg. water. The further treatment of the masses thus obtained is as above.

4. Mix 30 kg. benzylcellulose with 25 kg. alcohol; also mix 60 kg. size with 20 kg. of a mixture of equal parts of alcohol and water. The further treatment of the masses thus obtained is as above.

5. Mix 30 kg. ethylcellulose with 25 kg.

alcohol; also mix 60 kg. casein with 12 kg. alcohol and 12 kg. water. The further treatment of the masses thus obtained is as above.

6. Mix 30 kg. nitrocellulose with 10 kg. of a suitable gelatinizing agent, for instance triacetin, and 30 kg. water (that is without other volatile solvents) : also mix 60 kg. size with 5 kg. acetone and 20 kg. water. The further treatment of the masses thus obtained is as above.

In all the above examples the proportion of cellulose derivatives to proteins may of course be varied; thus for instance, instead of adopting the proportion 1:2, the proportion may be reversed to 2:1 for obtaining a different technical effect.

Having now particularly described and ascertained the nature of my said invention and in what manner the same is to be performed, I declare that what I claim is:

The process for the production of artificial horn, consisting in first mixing about 30 parts in weight of a cellulose derivative with about 20 parts of alcohol and some water; then mixing separately about 60 parts of unchanged commercial casein with about 10 parts of water and 5 parts of alcohol; and lastly thoroughly kneading together the two mixtures until a homogeneous mass is obtained; said cellulose derivatives being selected from the group consisting of nitrocellulose, acetylcellulose, ethylcellulose and benzylcellulose.

In testimony whereof I have signed my name to this specification.

Dr. FRITZ SCHMIDT.